A. C. THRING.
SUN POWER WATER HEATER.
APPLICATION FILED SEPT. 19, 1913.
1,093,498. Patented Apr. 14, 1914.
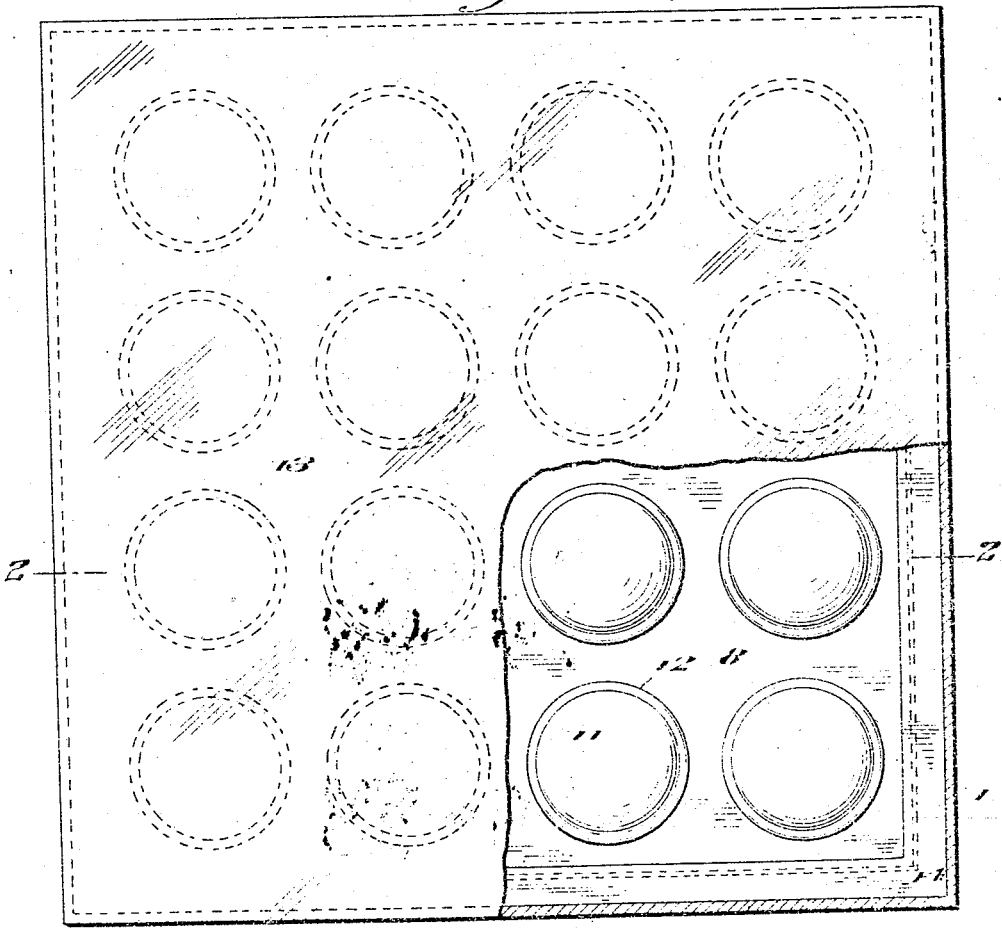
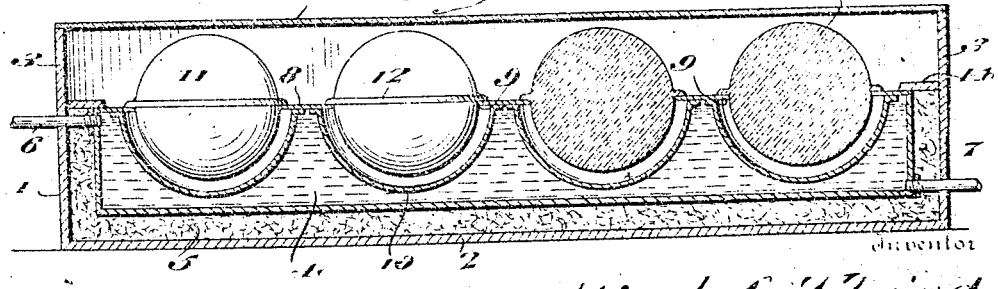

UNITED STATES PATENT OFFICE.

ALFRED C. THRING, OF PHILADELPHIA, PENNSYLVANIA.

SUN-POWER WATER-HEATER.

1,093,498.  Specification of Letters Patent.  Patented Apr. 14, 1914.

Application filed September 19, 1913. Serial No. 790,705.

*To all whom it may concern:*

Be it known that I, ALFRED C. THRING, a citizen of the United States, residing at Philadelphia, in the county of Philadelphia and State of Pennsylvania, have invented new and useful Improvements in Sun-Power Water-Heaters, of which the following is a specification.

This invention is an improved sun-power water heater for concentrating the rays of the sun and utilizing the same to heat water, the object of the invention being to provide an improved apparatus of this character which is cheap and simple in construction, is strong and durable and the parts of which may be readily removed.

The invention consists in the construction, combination and arrangement of devices hereinafter described and claimed.

In the accompanying drawings: Figure 1 is a plan of a sun-power water heater constructed in accordance with my invention with a portion of the glass top plate removed and a portion of the wall of the casing shown in section. Fig. 2 is a vertical sectional view of the same on the plane indicated by the line 2—2 of Fig. 1.

The casing 1 is here shown as rectangular and comprising a bottom 2 and walls 3. A water tank 4 which is smaller than the casing, is arranged therein and spaced from the wall and bottom thereof, the space between the tank and the casing being filled with non-conducting material as at 5. At opposite sides of the tank are inlet and outlet pipes 6 and 7. The tank is provided with a cover 8 which has circular openings 9 and under the said openings are semi-spherical radiating casings 10 which are made of metal and in practice are preferably welded to the cover 8.

Lenses 11 which are here shown as spherical are arranged to be placed in the openings 9 and are provided with peripheral flanges 12 which bear on the top plate or cover 8 of the tank and serve to support the lenses so that their upper halves project above the plate 8 and their lower halves extend down into and are spaced from the radiating casings 10. The water in the tank surrounds the said radiating casings and is directly in contact with it as shown. The flanges 12 enable the lenses to be readily removed when desired. The outer casing 1 is provided with a glass top 13. A flange 14 is arranged around the inner side of the wall of the casing 1 and bears on the top 8 of the water tank and also covers the insolating material 5.

In the operating of my water heater the rays of the sun are focused by the lenses 12 and caused to highly heat the radiating casings 10 and the latter, being in direct contact with the water, heats the water as will be understood. The non-conducting packing 5 retains the heat and minimizes the loss of heat by radiation.

My improved sun-power water heater may be employed for heating water for various purposes.

Having thus described my invention, I claim:

1. A sun-power water heater comprising a casing, a water tank therein and spaced from the walls thereof, non-conducting material in the space between the casing and the tank, a cover for the tank having openings therein and radiating casings on the under side of the tank cover, under the said openings and arranged in the water in the tank, and lenses on the tank cover in the said openings and provided with supporting flanges which bear on the tank cover.

2. The herein described sun-power water heater comprising a casing, a water tank in the lower portion of the casing spaced from the walls and bottom thereof, non-conducting material in the space between the casing and the tank, a cover for the tank having circular openings therein and semi-spherical radiating casings on the under side of the cover, under said openings and arranged in the water in the tank, spherical lenses having their lower portions arranged in said radiating casings, said lenses having supporting flanges which bear on the tank cover and a glass top on the outer casing.

In testimony whereof I affix my signature in presence of two witnesses.

ALFRED C. THRING.

Witnesses:
HELEN G. DALEY,
NORMAN J. SMITH.